United States Patent Office 3,095,413
Patented June 25, 1963

3,095,413
METALLIC DERIVATIVES OF 2,3-DIMERCAPTO QUINOXALINES
Klaus Sasse, Cologne-Stammheim, Richard Wegler, Leverkusen, and Günter Unterstenhöfer, Opladen, Germany, assignors to Farbenfabriken Bayer Aktiengesellschaft, Leverkusen, Germany, a corporation of Germany
No Drawing. Filed Jan. 6, 1961, Ser. No. 80,986
Claims priority, application Germany Jan. 16, 1960
10 Claims. (Cl. 260—242)

The present invention relates to and has as its objects new and useful compounds in the field of plant protection and processes for their preparation. The new compounds of this invention may be represented by the following general formula

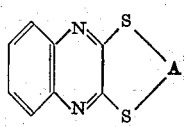

in which A stands for one common or two separate metal-organic radicals, the metal being especially taken from the 3rd, 4th and 5th group of the periodic system of elements, and in which the benzenic part of the quinoxaline ring system also may furthermore be substituted by suitable or optional substituents.

The objects of the copending application Serial No. 823,825 filed on June 30, 1959, are some related new reaction products of 2,3-dimercapto-quinoxalines, which are obtained by reacting in known manner 2,3-dimercapto-quinoxaline or its nucleus-substituted products or the salts thereof with inorganic or organic acid halides or anhydrides, or with isocyanates or isothiocyanates, preferably in the presence of an inert solvent, and optionally in the presence of a hydrogen halide-binding substance. These compounds exhibit remarkable acaricidal and fungicidal properties.

In accordance with the present invention it has now been found that also derivatives of 2,3-dimercapto-quinoxaline of the general Formulae I and II

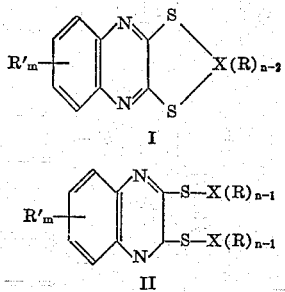

which have not been described in the above indicated copending application Ser. No. 823,825 and wherein more particularly R stands for an organic radical directly linked with X via a carbon atom, R' represents a substituent inert towards acid halides or anhydrides such as, for example, the halogen radical, a nitro, alkyl or alkoxy group, m is a number from 1–4, n the valency of X, and X denotes a hetero element such as arsenic, antimony, bismuth, silicon, tin and boron, have likewise good acaricidal and fungicidal and some exhibit also insecticidal properties.

The production of these compounds is effected by reacting 2,3-dimercapto-quinoxalines or their nucleus-substituted derivatives with compounds of the formulae $R_{(n-2)}X=O$ or $R_{(n-2)}XAn_2$, or $R_{(n-1)}X\text{—OH}$ or $R_{(n-1)}XAn$ corresponding to the following reaction equations:

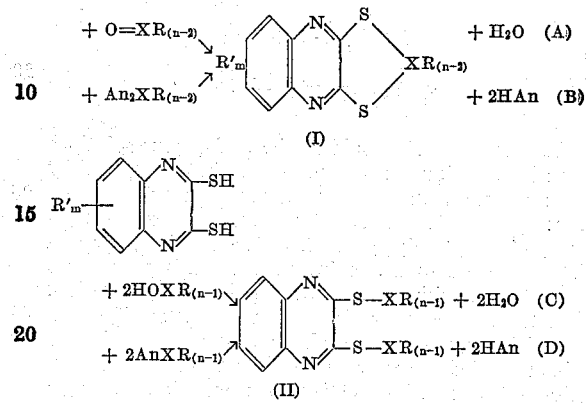

In the above formulae R, X and n have the aforesaid significance and An stands for an acid radical, especially halogen atoms.

The reactions according to the Equations A and C are carried out, preferably in inert diluents, by mixing 2,3-dimercapto-quinoxalines with the oxygen compounds $R_{(n-2)}X=O$ or their hydrates, or with the hydroxy compounds $R_{(n-1)}XOH$ whereby, in general, further reaction catalysts are not necessary. Dimethyl formamide is especially suitable as diluent since it enables operating in a practically homogeneous phase. Mostly the reactions start already at room temperature and are completed by subsequent heating, if necessary. In some cases it may be useful to remove azeotropically from the mixture the water formed in the reaction.

In case of the reaction in the directions of Equations B and D, acid-binding agents are, in general, required. The process may be carried out by introducing the compounds $R_{(n-2)}XAn_2$ or $R_{(n-1)}XAn$ into solutions or suspensions of the free 2,3-dimercapto-quinoxalines in inert solvents, and by adding, before, during or after the introduction, the acid-binding agent especially in the form of an alkali metal or alkaline earth metal hydroxide or carbonate or of a tertiary amine, or by carrying out the reaction in a tertiary amine, e.g. pyridine, as solvent. Alternatively, it is, however, also possible to react said compounds with solutions or suspensions of metal or amine salts of dimercapto-quinoxalines in the absence of further basic additives.

The compounds obtainable according to the invention can be used in various manner as pest control agents on account of their insecticidal, acaricidal and fungicidal properties. They very effectively kill insects like flies, mites, aphids, etc. They distinguish themselves especially by a good contact-insecticidal activity and at the same time by an activity on eating insects such as caterpillars. The compounds may be used in the same manner as other known plant protecting agents, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As examples for the special utility of the inventive compounds the ester of the following formulae

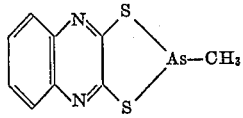

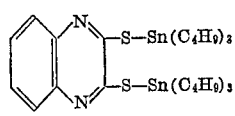

have been tested against spider mites. Aqueous solutions of the aforementioned compounds have been prepared by admixing them with the same amount of an auxiliary solvent (acetone). A commercial emulsifier (benzyl-hydroxy diphenyl polyglycol ether) is added in an amount of 20% referred to active ingredient. This premixture then is diluted with water to the desired concentration. The tests have been carried out as follows: (contact-insecticidal action). Bean plants (*Phaseolus vulgaris*) of about 15 inches height were sprayed drip wet with solutions as prepared above in a concentration as shown below. The bean plants have been infested heavily with the two-spotted spider (species *Tetranychus talarius*). Evaluation has been carried out after 24 hours, 48 hours and 8 days. The following results have been obtained:

(1) The compound kills to 90% post-embryonic spider mites at a concentration of 0.2% within 48 hours. Plants treated with the same concentration are completely free from living spider mites after 8 days.

(2) At a concentration of 0.02%, the compound kills spider mites (*Tetranychus telarius*) and caterpillars (*P. macullipennis*) to 100% and *M. persicae* to 95%.

The following examples are given for the purpose of illustrating the invention.

*Example 1*

19.4 g. of 2.3-dimercapto-quinoxaline are finely powdered and stirred in 150 ml. of dimethyl formamide until they are almost completely dissolved. 10.6 g. of methyl arsine oxide are added at room temperature with further stirring. With spontaneous heating to about 40° C. the color of the mixture turns from a deep brown to a pale yellow. Stirring is continued at room temperature for a further 1½ hours, small portions of undissolved components are filtered off, and the reaction product is precipitated from the filtrate by the addition of water. After drying, there are obtained 25 g. of the compound of the formula

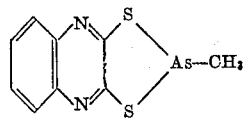

Upon recrystallisation from carbon tetrachloride, it has a melting point of 163° C. As content: calculated 26.6%, found 26.9%.

The compound kills to 90% post-embryonic spider mites at a concentration of 0.2% within 48 hours. Plants treated with the same concentration are completely free from living spider mites after 8 days.

By the same way there may be obtained the following compounds:

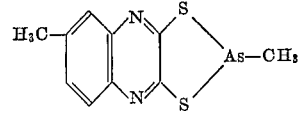

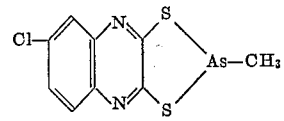

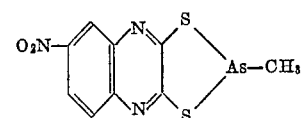

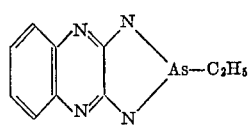

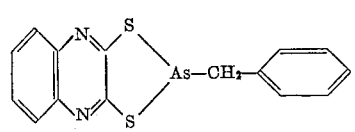

*Example 2*

15.3 g. of finely powdered 2.3-dimercapto-quinoxaline are suspended in 200 ml. of dimethyl formamide until they are almost completely dissolved and treated at room temperature, in portions, with 17 g. of phenyl stibine oxide. The mixture is stirred at room temperature for a further ½ hour and then slowly heated to 60° C. This temperature is maintained until no further brightening of the mixture takes place. It is then cooled and filtered off with suction from the insoluble contaminations. The filtrate is treated with water, the precipitated yellow product filtered off with suction and washed with water and alcohol. Yield 23 g. of a compound of the formula

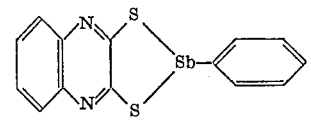

It can be purified by dissolution in hot glycol monomethyl ether and precipitation with methanol. Antimony content: calculated 31.1% found 29.9%.

By the same way there may be obtained the following compounds:

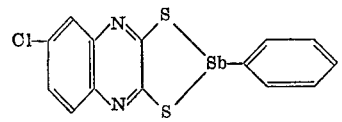

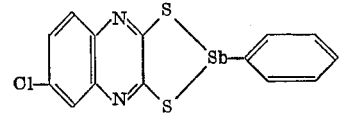

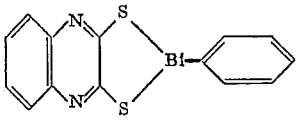

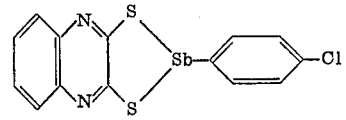

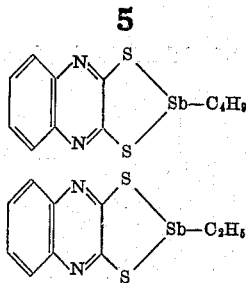

Example 3

19.4 g. of finely powdered 2.3-dimercapto-quinoxaline are stirred in 150 ml. of dimethyl formamide until they are almost completely dissolved and treated at about 50° C. in portions with 24.9 g. of dibutyl tin oxide. After completion of the introduction, the temperature is slowly raised to 90° C. At about 70° C. a nearly clear, yellow solution is obtained. It is decanted from some insoluble precipitate and treated after cooling with about ¾ litres of water. The precipitated yellow product is filtered off with suction, washed with water and alcohol and dried. Yield 33 g. of a compound of the formula

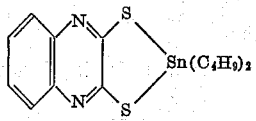

which, upon reprecipitation from carbon tetachloride/ligroin melts at 188° C. Tin content: calculated 27.9%, found 27.2%.

Example 4

A solution of 30 g. of 2.3-dimercapto-quinoxaline and 12.5 g. of sodium hydroxide in 100 ml. of water is diluted with 100 ml. of acetone and then treated dropwise at a temperature below 15° C. while stirring and cooling with 90 g. of tributyl tin chloride. The mixture is stirred for a further ½ hour at room temperature, treated with water, and the separated oil is taken up in benzene. The benzene solution is washed with water several times and then dried over sodium sulfate. After distilling off the benzene there remain as a pale yellow oil 78 g. of a compound of the formula

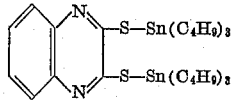

Tin content: calculated 30.7%, found 21.2%.

At a concentration of 0.02%, the compound kills caterpillars (P. maculipennis) to 100% and M. persicae to 95%.

Example 5

19.4 g. of 2.3-dimercapto-quinoxaline are dissolved in a solution of 8 g. of sodium hydroxide in 100 ml. of water. After dilution with 100 ml. of acetone, a solution of 20 g. of diethyl-tin-dichloride in acetone is added dropwise at room temperature with stirring and external cooling. The mixture is stirred at room temperature for a ½ hour, then for a further hour at 40° C., diluted with water, and the crystalline reaction product is filtered off with suction. It is purified by dissolution in alcohol and precipitation with water. Thus, 16 g. of the pure compound of the formula

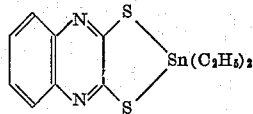

are obtained of M.P. 218–220° C.

Example 6

9.7 g. of 2.3-dimercapto-quinoxaline are dissolved in a solution of 4 g. of sodium hydroxide in 50 ml. of water. The resultant solution of the disodium salt of 2.3-dimercapto-quinoxaline is diluted with 100 ml. of acetone and treated dropwise at a temperature below 25° C. while stirring and cooling with 20 g. of tripropyl tin chloride. The reaction mixture is stirred at room temperature for a further ½ hour and at 40° C. for another hour, then treated with water, and the precipitate formed is filtered off with suction. Upon recrystallization from alcohol, 15 g. of a compound of the formula

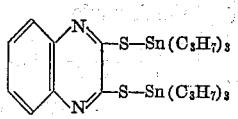

of melting point 108–110° C. are obtained.

At a concentration of 0.02%, the compound kills caterpillars to 100%, and at a concentration of 0.2%, also spider mites and D. fabae to 100%.

In analogous manner there are obtained, starting from 2.3-dimercapto-quinoxaline and the corresponding trialkyl tin chlorides the following compounds:

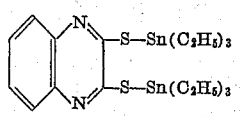

M.P. 115°

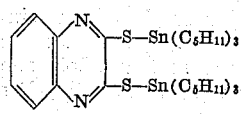

brown-yellow oil

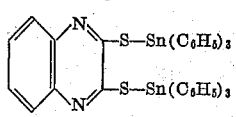

brown-yellow oil

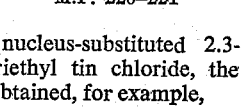

M.P. 220–221°

By reacting nucleus-substituted 2.3-dimercapto-quinoxalines with triethyl tin chloride, the following compounds may be obtained, for example,

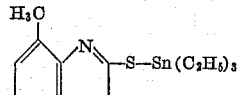

M.P. 90–91°

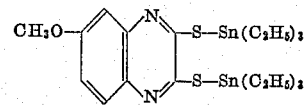

brown-yellow oil

Example 7

A solution of 5 g. of 2.3-dimercapto-quinoxaline in 150 ml. of dimethyl formamide is treated dropwise at room temperature with 14 g. of tri-isopropyl-tin methoxide. To complete the reaction the mixture is stirred at room temperature for ½ hour and then further stirred while slowly raising the temperature to 70° C. until the initially dark brown solution has become pale yellow. The reaction mixture is then cooled and treated with water. The separated crystals are filtered off with suction and dried. In this way, 12 g. of a compound of the formula

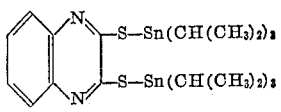

are obtained which melts at 174° C. after recrystallization from alcohol.

We claim:
1. A compound of the formula

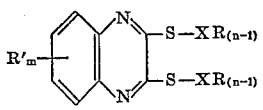

wherein X stands for a member selected from the group consisting of arsenic, antimony, bismuth, silicon, tin and boron, R being a member selected from the group consisting of lower alkyl, phenyl and chlorophenyl, $n$ being the valency number of X and wherein R' stands for a member selected from hydrogen, lower alkyl, hydrogen atom and nitro and $m$ is a whole number up to two.

2. A compound of the formula

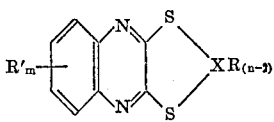

wherein X stands for a member selected from the group consisting of arsenic, antimony, bismuth, silicon, tin and boron, R being a member selected from the group consisting of lower alkyl, phenyl and chlorophenyl, $n$ being the valency number of X and wherein R' stands for a member selected from hydrogen, lower alkyl, halogen atom and nitro and $m$ is a whole number up to two.

3. The compound of the following formula:

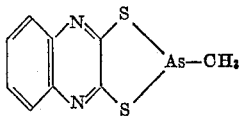

4. The compound of the following formula:

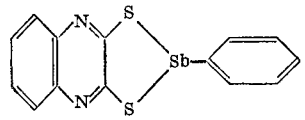

5. The compound of the following formula:

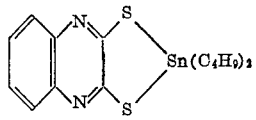

6. The compound of the following formula:

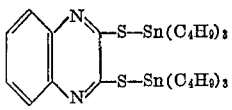

7. The compound of the following formula:

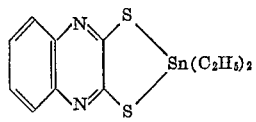

8. The compound of the following formula:

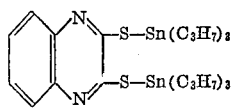

9. The compound of the following formula:

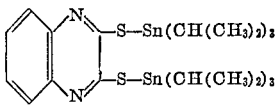

10. The compound of the following formula:

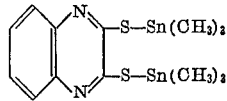

No references cited.